(12) United States Patent  (10) Patent No.: US 9,191,469 B2
Wentink et al.                (45) Date of Patent: Nov. 17, 2015

(54) ACKNOWLEDGEMENT (ACK) TYPE INDICATION AND DEFERRAL TIME DETERMINATION

(71) Applicant: QUALCOMM Incorporated, San Diego, CA (US)

(72) Inventors: Maarten Menzo Wentink, Naarden (NL); Alfred Asterjadhi, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 14/184,562

(22) Filed: Feb. 19, 2014

(65) Prior Publication Data
US 2014/0233551 A1 Aug. 21, 2014

Related U.S. Application Data (60) Provisional application No. 61/769,718, filed on Feb. 26, 2013, provisional application No. 61/767,240, filed on Feb. 20, 2013.

(51) Int. Cl.
*H04L 29/06* (2006.01)
*H04L 1/18* (2006.01)
*H04L 1/16* (2006.01)

(52) U.S. Cl.
CPC .............. *H04L 69/22* (2013.01); *H04L 1/1854* (2013.01); *H04L 1/1896* (2013.01); *H04L 1/1621* (2013.01)

(58) Field of Classification Search
CPC ... H04W 28/06; H04W 84/12; H04W 28/065; H04W 52/0219; H04W 74/04; H04W 28/04; H04W 28/044; H04W 52/0216; H04W 72/005; H04W 72/042; H04W 72/14; H04W 74/06; H04W 48/00; H04W 52/0203
USPC .................. 370/338, 311, 328, 329
See application file for complete search history.

(56) References Cited

U.S. PATENT DOCUMENTS

| | | | |
|---|---|---|---|
| 7,184,407 B1 * | 2/2007 | Myles et al. | 370/242 |
| 7,940,688 B1 | 5/2011 | Benveniste | |
| 2005/0165950 A1 * | 7/2005 | Takagi et al. | 709/236 |

(Continued)

FOREIGN PATENT DOCUMENTS

| | | |
|---|---|---|
| EP | 1571773 A2 | 9/2005 |
| WO | WO-2012064502 A1 | 5/2012 |

OTHER PUBLICATIONS

Alfred Asterjadhi (QUALCOMM): "Short BA; 11-12-0859-00-00ah-short-ba", IEEE SA Mentor; 11-12-0859-00-00AH-SHORT-BA, IEEE-SA Mentor, Piscataway, NJ USA, vol. 802.11 ah, Jul. 16, 2012, pp. 1-11, XP068039407, [retrieved on Jul. 16, 2012].

(Continued)

*Primary Examiner* — Edan Orgad
*Assistant Examiner* — Emmanuel Maglo
(74) *Attorney, Agent, or Firm* — Patterson & Sheridan, LLP (57) ABSTRACT

Certain aspects of the present disclosure provide methods and apparatus for indicating a type of response for acknowledging a protocol data unit. One example method for wireless communications by a first apparatus generally includes transmitting a physical layer convergence protocol (PLCP) protocol data unit (PPDU) to a second apparatus and setting at least one bit in a PLCP header of the PPDU to indicate a type of response expected from the second apparatus responsive to the transmitted PPDU.

34 Claims, 8 Drawing Sheets

(56) References Cited

U.S. PATENT DOCUMENTS

| | | | |
|---|---|---|---|
| 2006/0007891 A1 | 1/2006 | Aoki et al. | |
| 2006/0176908 A1* | 8/2006 | Kwon et al. | 370/473 |
| 2007/0147284 A1* | 6/2007 | Sammour et al. | 370/328 |
| 2007/0171933 A1* | 7/2007 | Sammour et al. | 370/447 |
| 2009/0252100 A1 | 10/2009 | Sridhara et al. | |
| 2009/0252145 A1* | 10/2009 | Meylan et al. | 370/348 |
| 2010/0246600 A1* | 9/2010 | Das et al. | 370/465 |
| 2011/0038332 A1 | 2/2011 | Liu et al. | |
| 2011/0222486 A1* | 9/2011 | Hart | 370/329 |
| 2011/0305176 A1 | 12/2011 | Wentink | |
| 2012/0113903 A1* | 5/2012 | Kneckt et al. | 370/329 |
| 2012/0163354 A1* | 6/2012 | Stacey et al. | 370/338 |
| 2013/0235773 A1* | 9/2013 | Wang et al. | 370/311 |
| 2013/0301569 A1 | 11/2013 | Wang et al. | |
| 2014/0112230 A1* | 4/2014 | Sammour et al. | 370/311 |
| 2014/0233478 A1 | 8/2014 | Wentink et al. | |

OTHER PUBLICATIONS

Liu Y (Marvell): "Short-ack ; 11-12-0324-02-00ah-short-ack" IEEE Draft; 11-12-0324-02-00AH-SH0RT-ACK, IEEE-SA Mentor, Piscataway, NJ USA, vol. 802.11ah, No. 2, Mar. 14, 2012, pp. 1-15, XP017672405, [retrieved on Mar. 14, 2012].

"Draft Amendment to Standard [for] Information Technology—Telecommunications and Information Exchange Between Systems—LAN/MAN Specific Requirements—Part 11: Wireless Medium Access Control (MAC) and Physical Layer (PHY) Specifications: Medium Access Control (MAC) Quality of Service (QOS) Enhance", IEEE P802.11E/D6.0, Nov. 1, 2003. pp. I-VIII,1, XP002570966, Retrieved from the Internet: URL:http://grouper.ieee.org/groups/802/11/ [retrieved on Mar. 2, 2010].

International Search Report and Written Opinion—PCT/US2014/017437—ISA/EPO—May 28, 2014.

Kuehnel T., "Proposed Normative Text for EDCA; 11-03-0502-00-000e-proposed-normative-text-for-edca-doc", IEEE Draft; 11-03-0502-00-000E-PROPOSED-NORMATIVE-TEXT NJ USA, vol. 802.11e, Jul. 21, 2003, pp. 1-8, XP017692186, [retrieved on Jul. 21, 2003] Section 9.10.1.5 Backoff procedure.

Liu Y., et al., (MARVELL): "Resolutions for mise CIDs ; 11-11-0604-01-00ac-resolutions-for-misc-ci ds", IEEE Draft; 11-11-0604-01-00AC-RESOLUTIONS-FOR-MISC-CI DS, IEEE-SA Mentor, Piscataway, NJ USA, vol. 802.11ac, No. 1, May 3, 2011, pp. 1-8, XP017674724, [retrieved on May 3, 2011] p. 4 table 8.235.

Scarpa V., "Calibration Using Ndp; 11-07-0042-01-000n-calibration-using-ndp", IEEE Draft; 11-07-0041-01-000N-CALIBRATION-USING-NDP, IEEE-SA Mentor, Piscataway, NJ USA, vol. 802.11n, No. 1, Jan. 11, 2007, pp. 1-7, XP017685285, [retrieved on Jan. 11, 2007] slides 2, 6-7.

* cited by examiner

| ACK indication in SIG | Response Type | Aggregation field in SIG | EOF of first MPDU delimiter with Length > 0 | Response | EIFS | Comments |
|---|---|---|---|---|---|---|
| 0 | No response | | | No response | 0 | Non-NDP Data, Management or Control frames that do not solicit a response. |
| 1 | NDP response | 0 | | NDP ACK | SIFS+NDP+DIFS | Single MPDU < 512 Bytes. The NDP ACK can also be an NDP CTS, but duration is the same. |
| 1 | NDP response | 1 | 0 | NDP ACK | SIFS+NDP+DIFS | VHT single MPDU ≥ 512 Bytes. Signals NDP ACK for VHT single MPDU. |
| 1 | NDP response | 1 | 1 | NDP BA | SIFS+NDP+DIFS | A-MPDU with NDP Block Ack. |
| 2 | Normal Control response | 0 | | Normal ACK | SIFS+ACK+DIFS | Single MPDU < 512 Bytes. The ACK MCS is determined on the MCS signaled in the SIG (assuming mandatory MCSs as basic MCS set). The Normal ACK can also be a Normal CTS, but duration is the same. |
| 2 | Normal Control response | 1 | 0 | Not allowed | | VHT single MPDU ≥ 512 Bytes. Could signal Normal ACK for VHT single MPDU, but EIFS can not be determined due to confusion with Normal Block Ack. NDP ACK is the only response type supported for VHT single MPDU. |
| 2 | Normal Control response | 1 | 1 | Normal BA | SIFS+BA+DIFS | A-MPDU with normal Block Ack. BA MCS determined on the MCS signaled in the SIG (assuming mandatory MCSs as basic MCS set). |
| 3 | Long response | | | RDG | SIFS+Max PPDU+DIFS | Reverse Direction Grant. Must be followed up by a truncating transmission with ACK indication < 3, such as an NDP ACK after the response PPDU. This EIFS is truncated by reception of another ACK indication field (as opposed to the EIFS for ACK indication < 3, which are never truncated). |

FIG. 4

| ACK indication in SIG | Response Type | Aggregation field in SIG | EOF of first MPDU delimiter with Length > 0 | Response | EIFS | Comments |
|---|---|---|---|---|---|---|
| 0 | No response | | | No response | 0 | Non-NDP Data, Management or Control frames that do not solicit a response. |
| 1 | NDP response | 0 | | NDP ACK | SIFS+NDP+DIFS | Single MPDU < 512 Bytes. The NDP ACK can also be an NDP CTS, but duration is the same. |
| | | 1 | 0 | NDP ACK | SIFS+NDP+DIFS | VHT single MPDU ≥ 512 Bytes. Signals NDP ACK for VHT single MPDU. |
| | | | 1 | NDP BA | SIFS+NDP+DIFS | A-MPDU with NDP Block Ack. |
| 2 | Normal Control response | 0 | | Normal ACK | SIFS+ACK+DIFS | Single MPDU < 512 Bytes. The ACK MCS is determined on the MCS signaled in the SIG (assuming mandatory MCSs as basic MCS set). The Normal ACK can also be a Normal CTS, but duration is the same. |
| | | 1 | 0 | Normal ACK + Post ACK EIFS | SIFS+BA+DIFS | VHT single MPDU ≥ 512 Bytes. Normal ACK response for VHT single MPDU, but with a Post ACK EIFS so that the time of resuming backoff is the same as at 3rd party receivers. |
| | | | 1 | Normal BA | SIFS+BA+DIFS | A-MPDU with normal Block Ack. BA MCS determined on the MCS signaled in the SIG (assuming mandatory MCSs as basic MCS set). |
| 3 | Long response | | | RDG | SIFS+Max PPDU+DIFS | Reverse Direction Grant. Must be followed up by a truncating transmission with ACK indication <3, such as an NDP ACK after the response PPDU. This EIFS is truncated by reception of another ACK indication field (as opposed to the EIFS for ACK indication <3, which are never truncated). |

FIG. 5

| ACK indication in SIG | Response Type | Aggregation field in SIG | EOF of first MPDU delimiter with Length > 0 | Response | EIFS | Comments |
|---|---|---|---|---|---|---|
| 0 | No response | | | No response | 0 | Non-NDP Data, Management or Control frames that do not solicit a response. |
| 1 | NDP response | 0 | | NDP ACK | SIFS+NDP+DIFS | Single MPDU < 512 Bytes. The NDP ACK can also be an NDP CTS, but duration is the same. |
| 1 | NDP response | 1 | 0 | NDP ACK | SIFS+NDP+DIFS | VHT single MPDU ≥ 512 Bytes. Signals NDP ACK for VHT single MPDU. |
| 1 | NDP response | 1 | 1 | NDP BA | SIFS+NDP+DIFS | A-MPDU with NDP Block Ack. |
| 2 | Normal Control response | 0 | | Normal ACK | SIFS+ACK+DIFS | Single MPDU < 512 Bytes. The ACK MCS is determined on the MCS signaled in the SIG (assuming mandatory MCSs as basic MCS set). The Normal ACK can also be a Normal CTS, but duration is the same. |
| 2 | Normal Control response | 1 | 0 | Normal ACK @ 32 octets | SIFS+BA+DIFS | VHT single MPDU ≥ 512 Bytes. Normal ACK response for VHT single MPDU, but with an ACK that has 32 octet length – for example a modified Block Ack frame or an ACK frame in an A-MPDU that has zero-length delimiters to fill it up until 32 octets. |
| 2 | Normal Control response | 1 | 1 | Normal BA | SIFS+BA+DIFS | A-MPDU with normal Block Ack. BA MCS determined on the MCS signaled in the SIG (assuming mandatory MCSs as basic MCS set). |
| 3 | Long response | | | RDG | SIFS+Max PPDU+DIFS | Reverse Direction Grant. Must be followed up by a truncating transmission with ACK indication <3, such as an NDP ACK after the response PPDU. This EIFS is truncated by reception of another ACK indication field (as opposed to the EIFS for ACK indication <3, which are never truncated). |

ACKNOWLEDGEMENT (ACK) TYPE INDICATION AND DEFERRAL TIME DETERMINATION

CLAIM OF PRIORITY UNDER 35 U.S.C. §119

This application claims benefit of U.S. Provisional Patent Application Ser. No. 61/767,240, filed Feb. 20, 2013, and U.S. Provisional Patent Application Ser. No. 61/769,718, filed Feb. 26, 2013, both of which are herein incorporated by reference in their entireties.

BACKGROUND

1. Field of the Invention

Certain aspects of the present disclosure generally relate to wireless communications and, more particularly, to indicating a type of response for acknowledging a protocol data unit.

2. Relevant Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

In order to address the desire for greater coverage and increased communication range, various schemes are being developed. One such scheme is the sub-1-GHz frequency range (e.g., operating in the 902-928 MHz range in the United States) being developed by the Institute of Electrical and Electronics Engineers (IEEE) 802.11ah task force. This development is driven by the desire to utilize a frequency range that has greater wireless range than other IEEE 802.11 groups and has lower obstruction losses.

SUMMARY

Aspects of the present disclosure generally relate to indicating, within a protocol data unit, a type of response for acknowledging the transmitted protocol data unit.

Certain aspects of the present disclosure provide a first apparatus for wireless communications. The first apparatus generally includes a transmitter configured to transmit a physical layer convergence protocol (PLCP) protocol data unit (PPDU) to a second apparatus and a processing system configured to set at least one bit in a PLCP header of the PPDU to indicate a type of response expected from the second apparatus responsive to the transmitted PPDU.

Certain aspects of the present disclosure provide an apparatus for wireless communications. The apparatus generally includes a receiver configured to receive a PPDU and a processing system configured to determine a type of response to send for the PPDU based on at least one bit in a PLCP header of the PPDU.

Certain aspects of the present disclosure provide a method for wireless communications by a first apparatus. The method generally includes transmitting a PPDU to a second apparatus and setting at least one bit in a PLCP header of the PPDU to indicate a type of response expected from the second apparatus responsive to the transmitted PPDU.

Certain aspects of the present disclosure provide a method for wireless communications by an apparatus. The method generally includes receiving a PPDU and determining a type of response to send for the PPDU based on at least one bit in a PLCP header of the PPDU.

Certain aspects of the present disclosure provide a first apparatus for wireless communications. The first apparatus generally includes means for transmitting a PPDU to a second apparatus and means for setting at least one bit in a PLCP header of the PPDU to indicate a type of response expected from the second apparatus responsive to the transmitted PPDU.

Certain aspects of the present disclosure provide an apparatus for wireless communications. The apparatus generally includes means for receiving a PPDU and means for determining a type of response to send for the PPDU based on at least one bit in a PLCP header of the PPDU.

Certain aspects of the present disclosure provide a computer program product for wireless communications. The computer program product generally includes a computer-readable medium having instructions generally executable to transmit a PPDU to an apparatus and to set at least one bit in a PLCP header of the PPDU to indicate a type of response expected from the apparatus responsive to the transmitted PPDU.

Certain aspects of the present disclosure provide a computer program product for wireless communications. The computer program product generally includes a computer-readable medium having instructions executable to receive a PPDU at an apparatus and to determine a type of response to send for the PPDU based on at least one bit in a PLCP header of the PPDU.

Certain aspects of the present disclosure provide a first wireless station for wireless communications. The first wireless station generally includes at least one antenna; a transmitter configured to transmit, via the at least one antenna, a PPDU to a second wireless station; and a processing system configured to set at least one bit in a PLCP header of the PPDU to indicate a type of response expected from the second wireless station responsive to the transmitted PPDU.

Certain aspects of the present disclosure provide a wireless station for wireless communications. The wireless station generally includes at least one antenna, a receiver configured to receive a PPDU via the at least one antenna, and a processing system configured to determine a type of response to send for the PPDU based on at least one bit in a PLCP header of the PPDU.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIGS. 4-6 illustrate example encodings of an acknowledgment (ACK) indication field, in accordance with certain aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The acronyms listed below may be used herein, consistent with commonly recognized usages in the field of wireless communications. Other acronyms may also be used herein, and if not defined in the list below, are defined where first appearing herein.

ACK . . . Acknowledgement
A-MPDU . . . Aggregated MAC Protocol Data Unit
AP . . . Access Point
BA . . . Block Ack
BAR . . . Block Ack Request
CRC . . . Cyclic Redundancy Check
DCF . . . Distributed Coordination Function
DIFS . . . DCF Interframe Space
EOF . . . End of Frame
EIFS . . . Extended Interframe Space
FCS . . . Frame Check Sequence
ID . . . Identifier
IEEE . . . Institute of Electrical and Electronic Engineers
LTF . . . Long Training Field
MAC . . . Media Access Control
MSB . . . Most Significant Bit
MIMO . . . Multiple Input Multiple Output
MPDU . . . MAC Protocol Data Unit
MU . . . Multi-User
MU-MIMO . . . Multi-User Multiple Input Multiple Output
NDP . . . Null Data Packet
OFDM . . . Orthogonal Frequency Division Multiplexing
OFDMA . . . Orthogonal Frequency Division Multiple Access
PHY . . . Physical Layer
PLCP . . . Physical Layer Convergence Protocol
PPDU . . . PLCP Protocol Data Unit
PSDU . . . PLCP Service Data Unit
QoS . . . Quality of Service
RDG . . . Reverse Direction Grant
S1G . . . Sub-1-GHz
SDMA . . . Spatial-Division Multiple Access
SIFS . . . Short Interframe Space
SIG . . . Signal
STA . . . Station
STBC . . . Space-Time Block Coding
STF . . . Short Training Field
SU . . . Single User
TCP . . . Transmission Control Protocol
VHT . . . Very High Throughput
WLAN . . . Wireless Local Area Network An Example Wireless Communication System The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, Radio Network Controller ("RNC"), evolved Node B (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music or video device, or a satellite radio), a global positioning system (GPS) device, or any other suitable device that is configured to communicate via a wireless or wired medium. In some aspects, the node is a wireless node. Such a wireless node may provide, for example, connectivity for or to a network (e.g., a wide area network such as the Internet or a cellular network) via a wired or wireless communication link.

Figure 1:
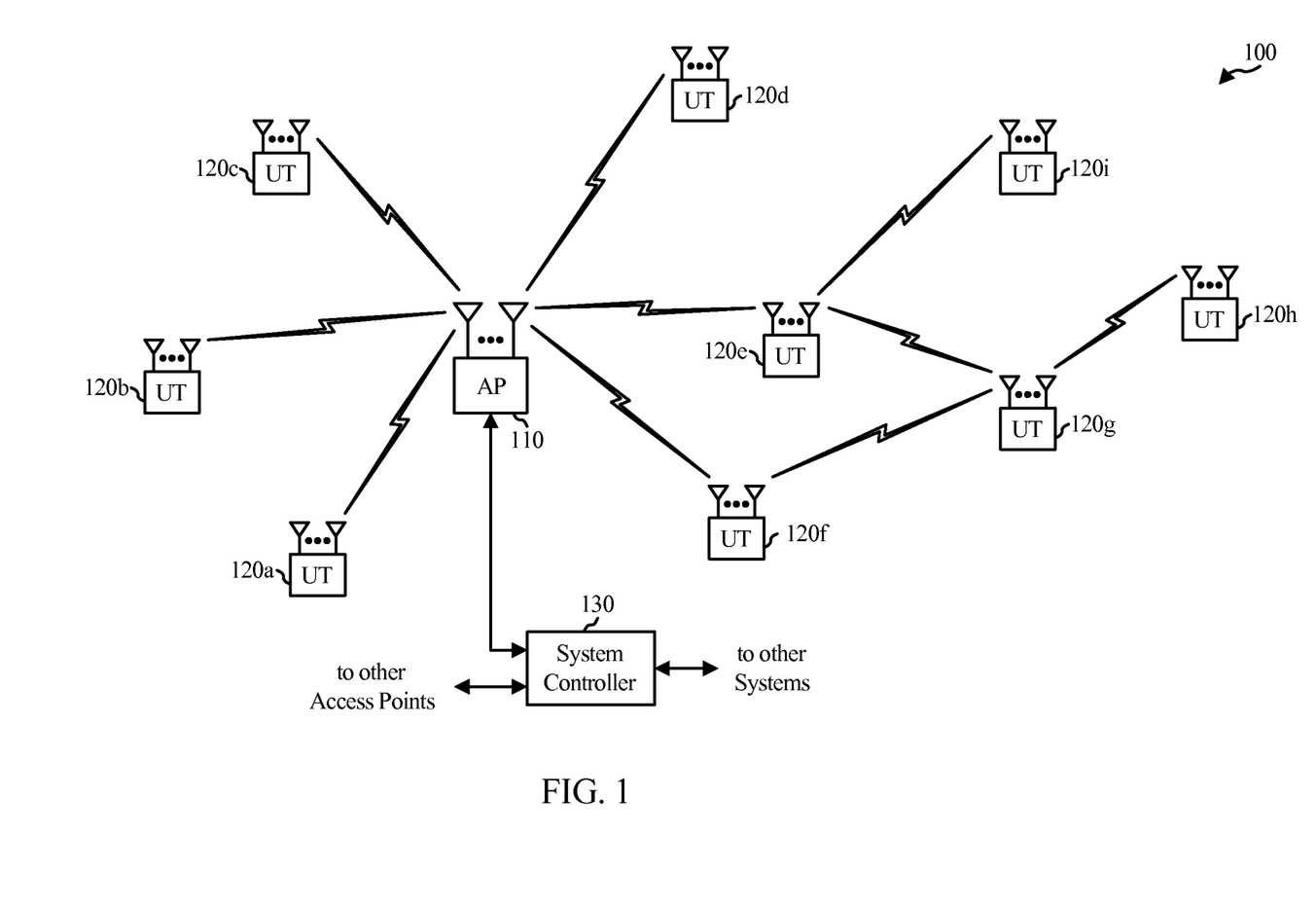
FIG. 1 illustrates an example wireless communications network, in accordance with certain aspects of the present disclosure.

FIG. 1 illustrates a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device, or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to a different user terminal 120.

Figure 2:
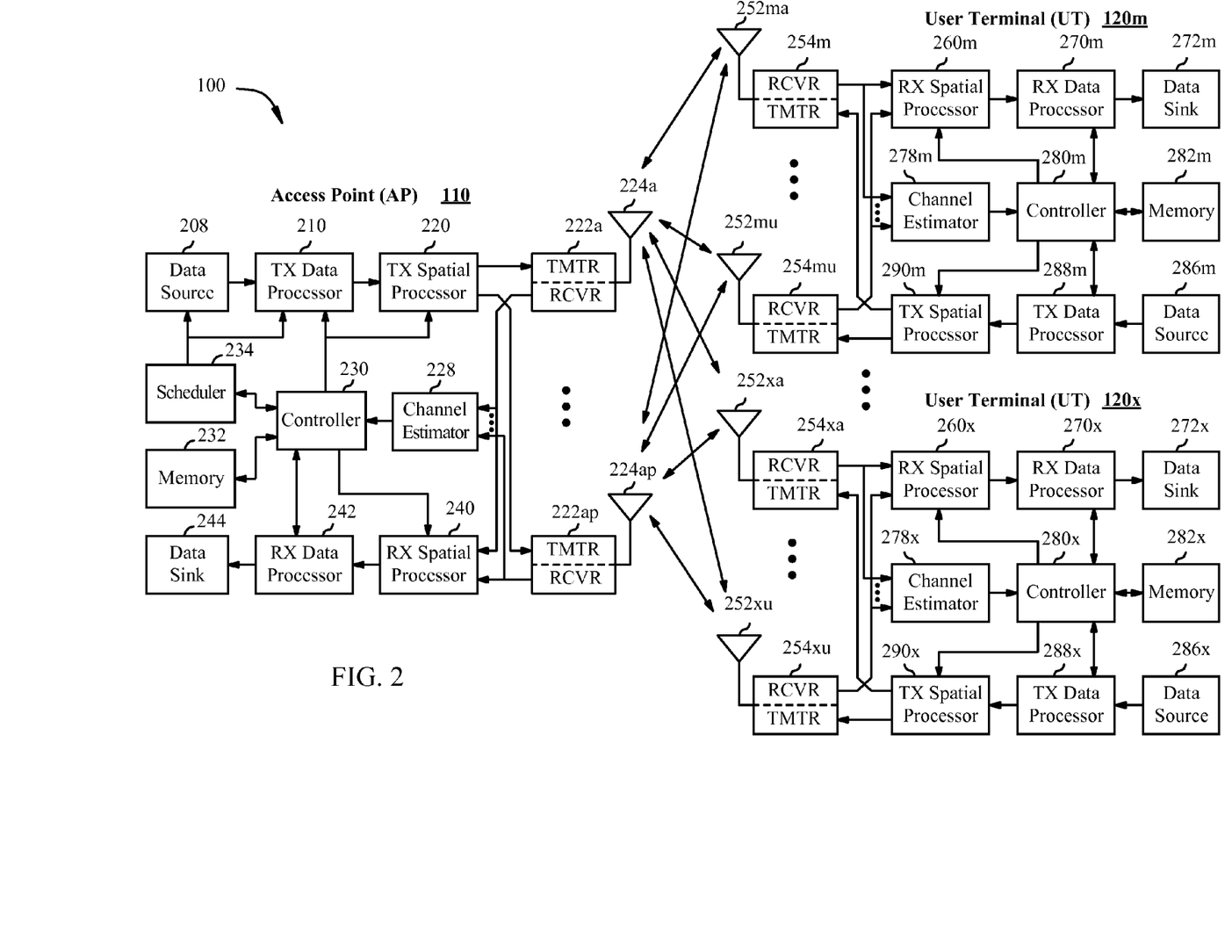
FIG. 2 is a block diagram of an example access point and user terminals, in accordance with certain aspects of the present disclosure.

FIG. 2 illustrates a block diagram of access point 110 and two user terminals 120m and 120x in MIMO system 100. The access point 110 is equipped with $N_t$ antennas 224a through 224t. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal On the uplink, at each user terminal 120 selected for uplink transmission, a transmit (TX) data processor 288 receives traffic data from a data source 286 and control data from a controller 280. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

Figure 3:
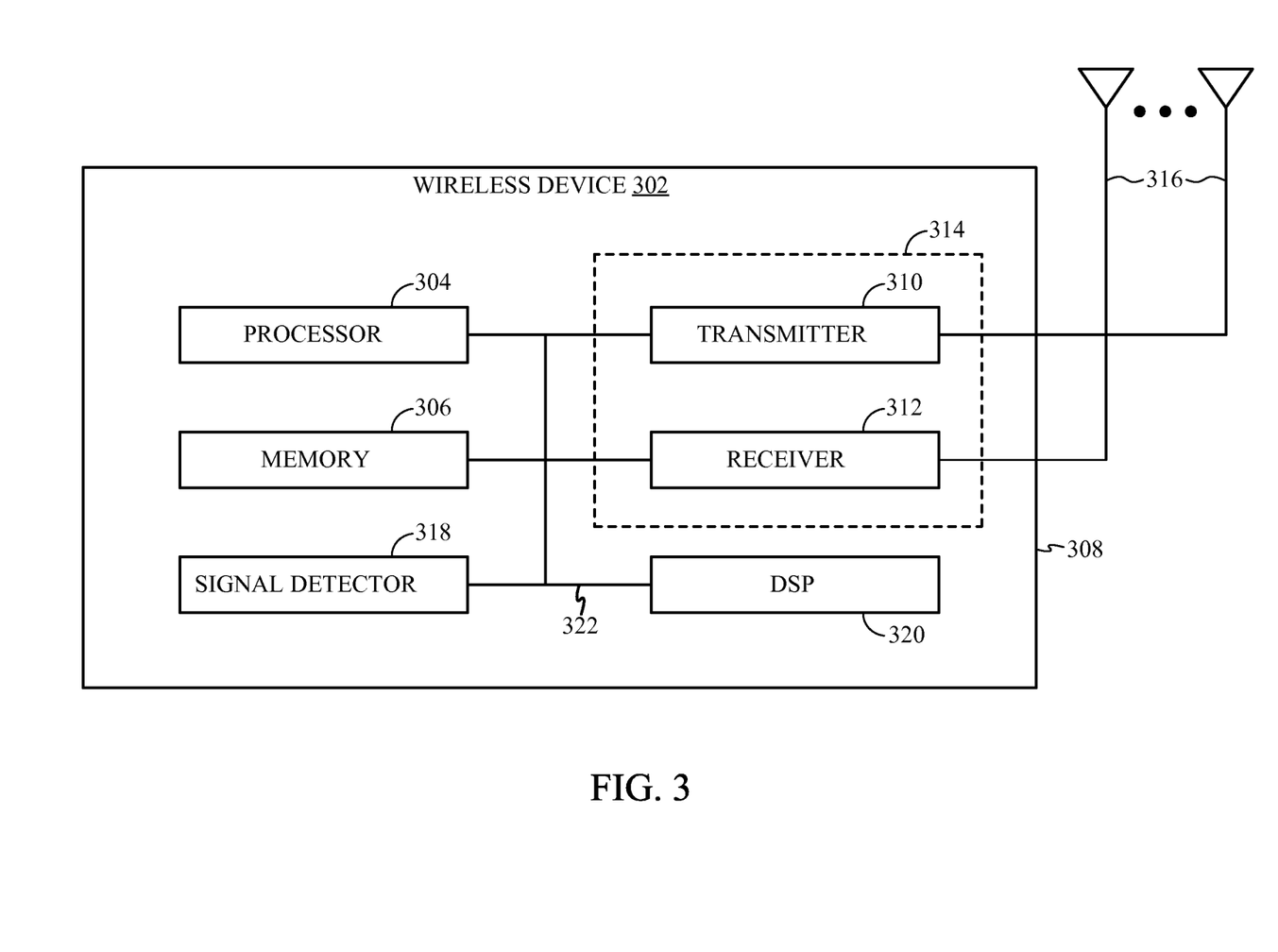
FIG. 3 is a block diagram of an example wireless device, in accordance with certain aspects of the present disclosure.

FIG. 3 illustrates various components that may be utilized in a wireless device 302 that may be employed within the MIMO system 100. The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Example ACK Type Indication and EIFS

IEEE 802.11 ah is an amendment to the IEEE 802.11 standard that allows for longer range in 802.11 networks. The 802.11 ah channels will be dedicated only for 802.11 ah, which implies that there are no legacy 802.11 devices in these channels. This allows one to redesign the PLCP header (also known as a PHY header) and to address the issue that third party receivers of a PPDU currently do not know whether there will be a response to the PPDU.

Certain aspects of the present disclosure provide techniques and apparatus for transmitting a PPDU (e.g., an S1G PPDU) that includes an ACK Indication field (also referred to as a Response Indication field) in the PLCP header of the PPDU. The ACK Indication field may indicate the type of response (if any) to the PPDU. The type of response is used by third party receivers (which are receivers that are not the recipient of an MPDU in the PPDU or that cannot decode the MPDU(s) in the PPDU) to defer for a possible response to the PPDU. Deferral may be based on an extended interframe space (EIFS) time prior to resuming backoff. An EIFS is started after the received PPDU if the MAC portion could not be decoded.

According to certain aspects, the ACK Indication field may be included in a SIGNAL (SIG) field of an S1G PPDU. The ACK Indication field may be 2 bits in size, designating four possible response types (0-3). An exemplary encoding of the ACK Indication field is illustrated in FIG. 4.

The convention in S1G is that MPDUs <512 bytes are indicated through an octet count in the SIG field and that packets ≥512 octets are indicated by the number of symbols of the PPDU. In the latter case, A-MPDU is used in the MAC portion of the frame (which implies that the octet count of the MPDU(s) is indicated by an MPDU delimiter, and also that block acknowledgment (Block Ack) can be used). Whether to interpret the Length field as an octet count or a symbol count depends on the setting of the Aggregation bit. For certain aspects, Length, Aggregation, and ACK Indication are part of the SIG field of the PLCP header. The End of Frame (EOF) field is part of the MPDU delimiter. When the first non-zero length MPDU delimiter has an EOF value equal to 1, this signals that only a single MPDU is present in the PPDU and that the response shall be an ACK frame (Normal or NDP format, where an NDP typically consists of only a PLCP header, i.e., a true null data packet). Otherwise, the response to an A-MPDU is a Block Ack (Normal or NDP format). The normal Block Ack frame is generally a 32-byte-long compressed type that includes an MPDU header, a starting sequence number (SSN), and a 64-bit Block Ack bitmap.

Reverse Direct Grant (RDG) generally refers to a mechanism that is used to grant the receiver time to send a response frame other than an ACK or Block Ack. The ACK Indication is set to Long Response (ACK Indication=3) for RDG.

Figure 4:
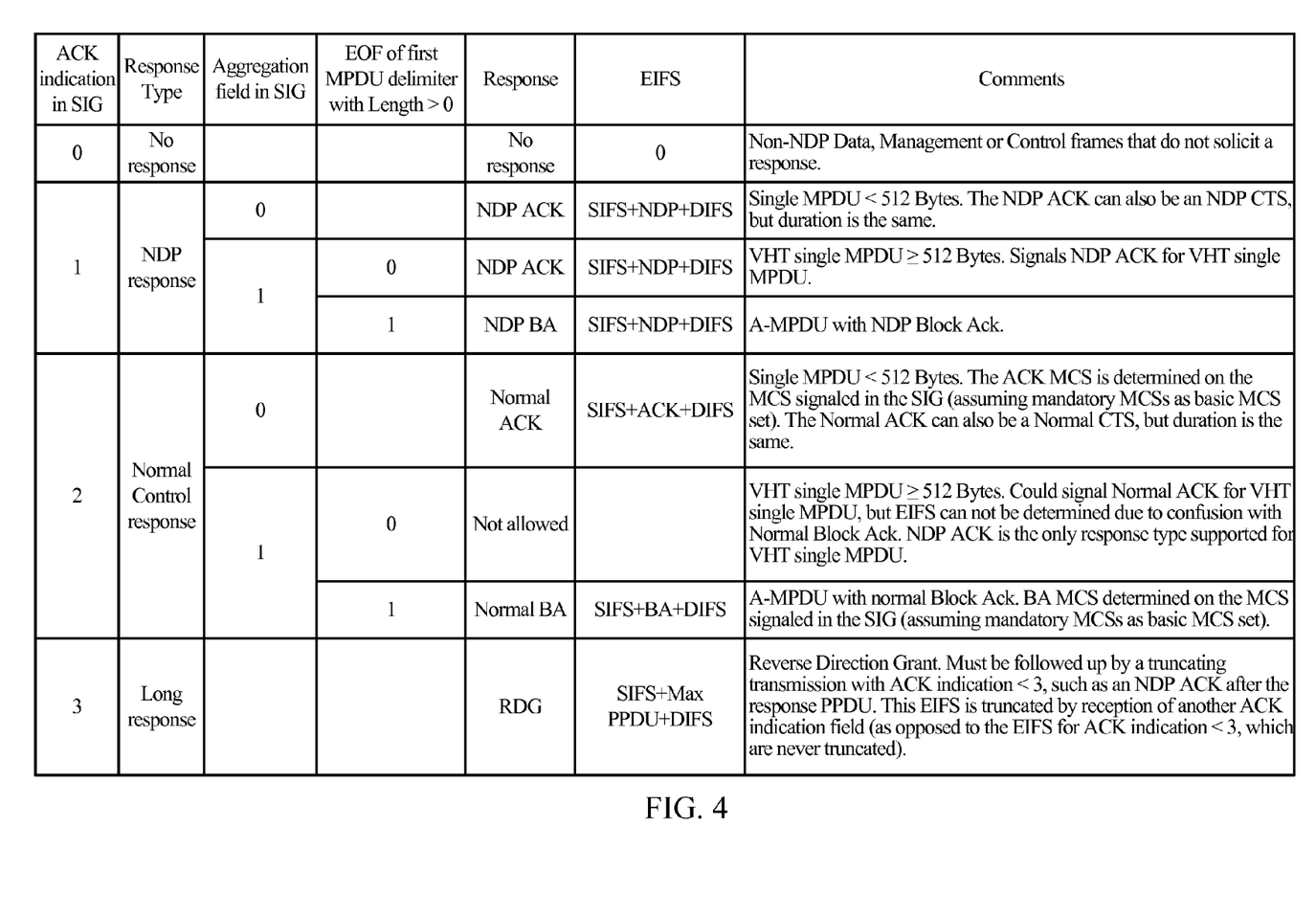

The exemplary ACK Indication field encoding illustrated in FIG. 4 provides an indication for no response, NDP response, normal (control) response, and long response. There is no indication for normal ACK in combination with Very High Throughput (VHT) single MPDU, because it is assumed that NDP ACK can be used in this case, instead of normal ACK. It is possible to add a normal ACK indication for VHT single MPDU, but this would entail a fifth response type, which implicates using 3 bits for the ACK Indication field. Only 2 bits are currently available, hence the design choice to omit the normal ACK option for VHT single MPDU.

Figure 5:
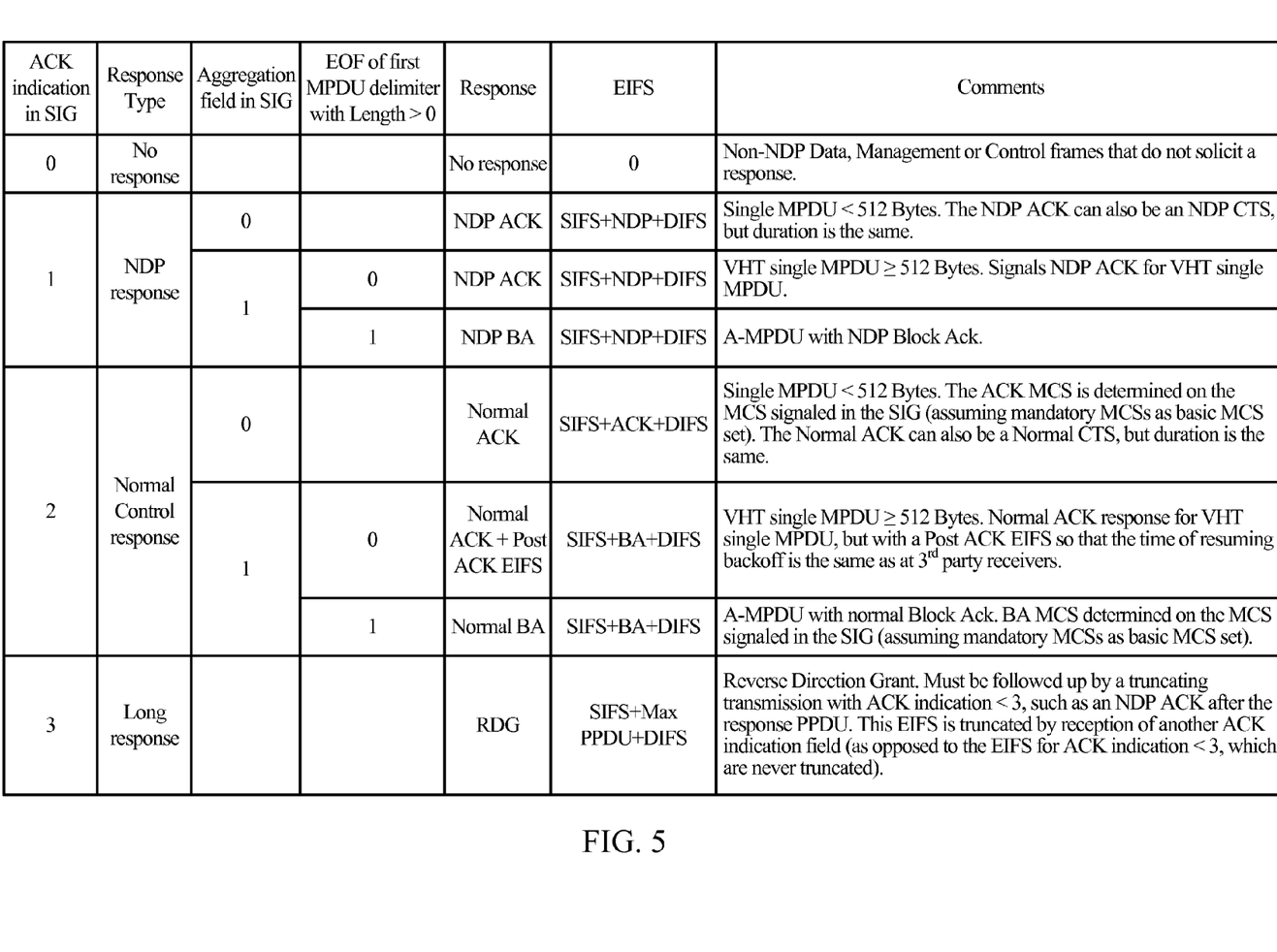

It is possible that a normal ACK is sent as a response to a VHT single MPDU using an ACK Indication value of 2 (normal response), but both the sender and the receiver of the normal ACK may observe a Post ACK EIFS that is equal to the difference in transmission time between a Block Ack (BA) and an ACK:

$$\text{Post ACK EIFS} = \text{BA transmit time} - \text{ACK transmit time}$$

An exemplary encoding of the ACK Indication field that includes a Post ACK EIFS (for VHT single MPDU) is shown in FIG. 5.

Another solution is to send a Block Ack frame instead of an ACK frame, in which the SSN and the Block Ack bitmap are set to all 0s or some other reserved value. Yet another solution is to send the ACK as an A-MPDU that is filled to 32 octets using zero length delimiters (a 4-octet non-zero MPDU delimiter, a 14-octet ACK, 2 octets of A-MPDU padding, and 3 zero-length delimiters). FIG. 6 illustrates an exemplary encoding of an ACK Indication field with a 32-octet ACK for VHT single MPDU.

The Long Response type potentially causes a very long EIFS to be started at third party receivers. To avoid unfairness, a PPDU with an ACK indication of Long Response (=3) may be followed up with a PPDU with a different ACK indication (<3). This follow-up PPDU truncates the EIFS at third party receivers and puts all contenders back on the same schedule to resume backoff.

In certain aspects, the techniques provided herein generally provide a mapping of ACK indication bits that allow a receiver selecting (and other STAs detecting) among multiple response frames (including NDP, normal control frames, and long frames) to a soliciting frame. The selection may be based on the ACK Indication field in the PHY preamble and, as described above, using other information available at the PHY preamble (e.g., the Aggregation bit), as well as some information at the MPDU delimiter (e.g., EOF). Certain aspects of the present disclosure also generally relate to the calculation of EIFS based on this indication.

In some cases, a new ACK indication may not have an explicit value for the 'Block Ack' ACK Policy from the QoS Control field, but only an implicit one. This may help bits in the ACK Indication field. In some cases, the implicit indication of 'Block Ack' ACK Policy may be provided via the following settings:

ACK Indication=0 (No Response)
Aggregation=1 (A-MPDU)
First non-zero length MPDU delimiter has EOF=0 (i.e., no VHT single A-MPDU)

When these values are in the PPDU header and the first non-zero length MPDU delimiter, then the ACK Policy is equal to 'Block Ack', which means that state is recorded with respect to the received MPDUs (i.e., a Block Ack bitmap can be formed based on it), but no Block Ack frame is sent after the PPDU.

Figure 7:
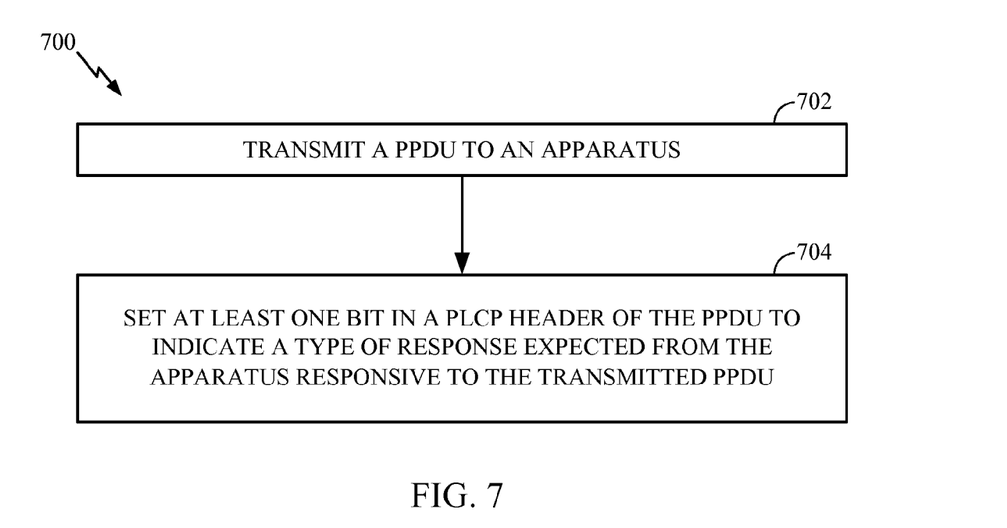
FIG. 7 is a flow diagram of example operations for wireless communications by an originator, in accordance with certain aspects of the present disclosure.

FIG. 7 is a flow diagram of example operations 700 for wireless communications by an originating (transmitting) apparatus, in accordance with certain aspects of the present disclosure. The operations 700 may begin, at 702, with the originating apparatus transmitting a PPDU to a receiving apparatus. At 704, before actual transmission at 702, the originating apparatus sets at least one bit in a PLCP header of the PPDU to indicate a type of response expected from the receiving apparatus responsive to the transmitted PPDU.

According to certain aspects, the operations 700 further include the originating apparatus selecting the indication (i.e., the type of response) from a group of types including at least one type that allows the response to be sent by the second apparatus in a null data packet (NDP).

According to certain aspects, the operations 700 further include the originating apparatus setting a bit in a Signal (SIG) field or a media access control (MAC) protocol data unit (MPDU) delimiter of the PPDU to a value that indicates the PPDU comprises a single MPDU.

According to certain aspects, the at least one bit is set to a value that indicates no response is expected.

According to certain aspects, the at least one bit is at least two bits set to a value that indicates no response is expected, that a null data packet (NDP) response is expected, that a normal response is expected, or that a long response is expected.

According to certain aspects, the operations 700 may further include the originating apparatus setting a bit in the PLCP header (e.g., in a SIG field) of the PPDU to a value that indicates whether the PPDU comprises an aggregated MAC protocol data unit (A-MPDU).

According to certain aspects, the operations 700 may further include the originating apparatus setting an End of Frame (EOF) value to zero of a first MPDU delimiter of the PPDU with a non-zero length field. This EOF value further indicates the type of response expected from the second apparatus responsive to the transmitted PPDU.

Figure 8:
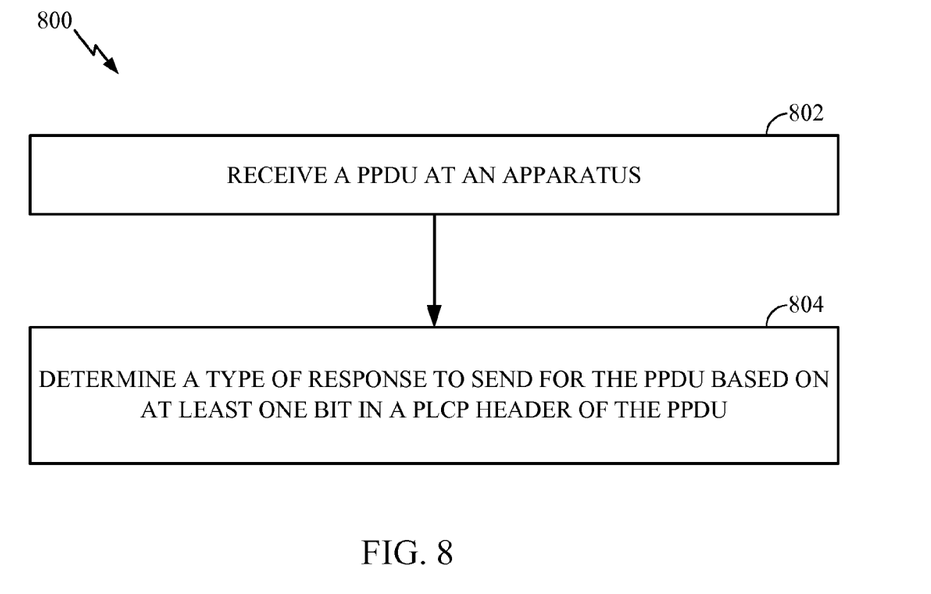
FIG. 8 is a flow diagram of example operations for wireless communications by a recipient, in accordance with certain aspects of the present disclosure.

FIG. 8 is a flow diagram of example operations 800 for wireless communications by a receiving apparatus, in accordance with certain aspects of the present disclosure. The operations 800 may begin, at 802, with the receiving apparatus receiving a PPDU. At 804, the receiving apparatus determines a type of response to send for the PPDU based on at least one bit in a PLCP header of the PPDU.

According to certain aspects, the type of response is selected from a group of types including at least one type that allows the response to be sent by the apparatus in a null data packet (NDP). In this case, the operations 800 may further involve the receiving apparatus transmitting the type of response in the NDP based on the determination.

According to certain aspects, determining the type of response at 804 may involve determining that the at least one bit is set to a value that indicates no response is to be sent.

According to certain aspects, the operations 800 may further include the receiving apparatus determining that a bit in the PLCP header (e.g., a SIG field) of the PPDU is set to a value that indicates the PPDU comprises an aggregated media access control (MAC) protocol data unit (A-MPDU) and transmitting a block acknowledgment (BA) in response to the PPDU based on the bit in the PLCP header (e.g., the SIG field). For certain aspects, the decision may be based on the EOF field in the MPDU delimiter.

According to certain aspects, the operations 800 may further include the receiving apparatus determining that a first non-zero length MPDU delimiter has an End of Frame (EOF) value set to zero and transmitting a block acknowledgment (BA) in response to the PPDU based on the EOF value.

According to certain aspects, the operations 800 may further entail the receiving apparatus transmitting the determined type of response.

According to certain aspects, the at least one bit is set to a value that indicates a long response is to be sent.

Figure 7A:
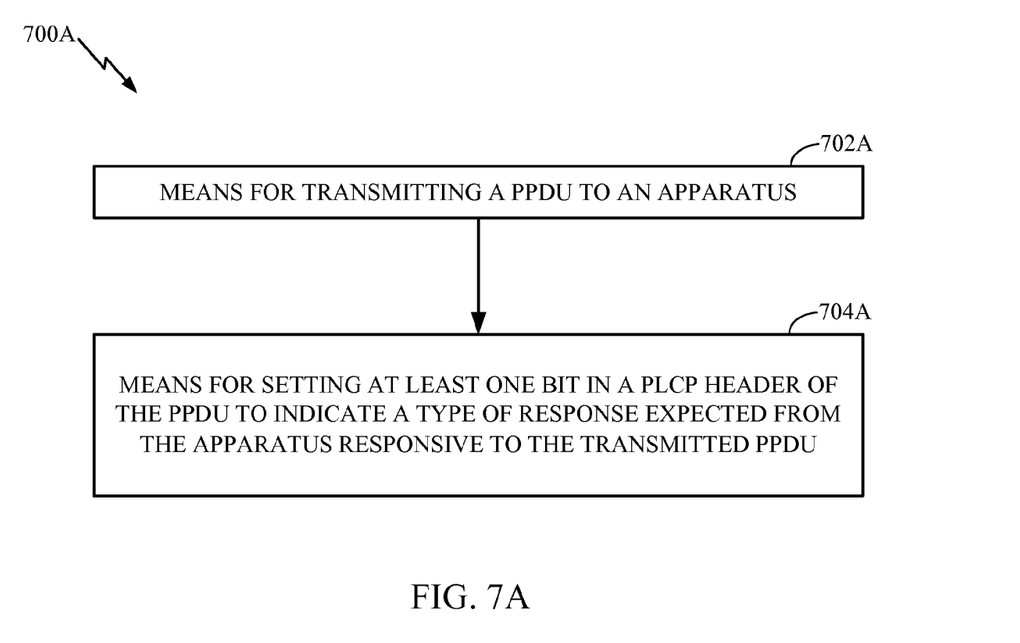
FIG. 7A illustrates example means capable of performing the operations shown in FIG. 7.
Figure 8A:
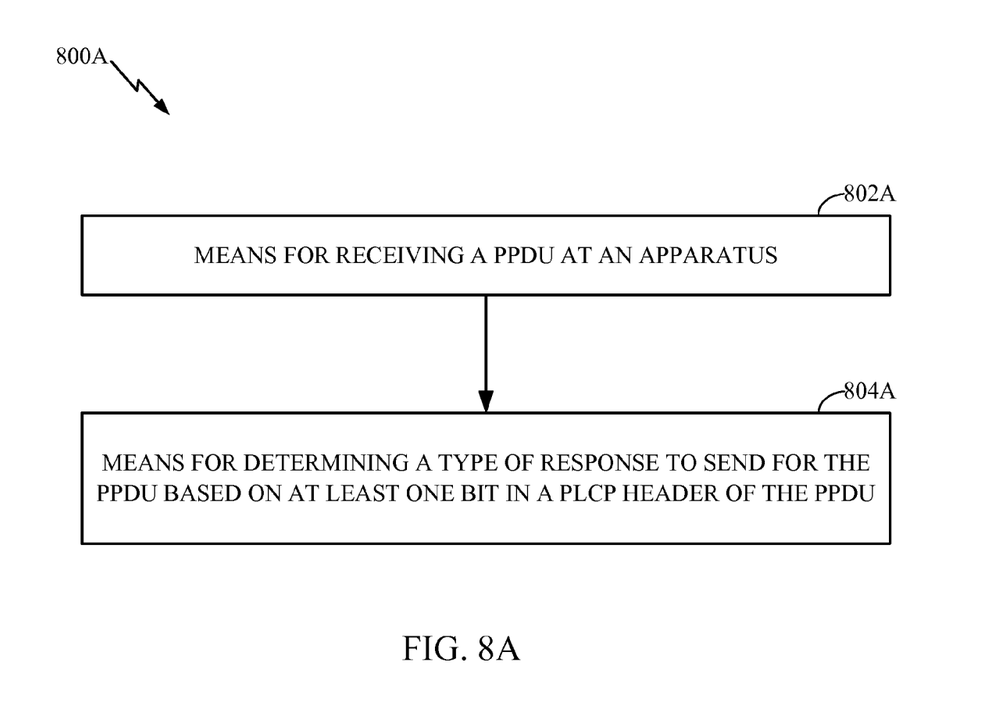
FIG. 8A illustrates example means capable of performing the operations shown in FIG. 8.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 700 and 800 illustrated in FIGS. 7 and 8 correspond to means 700A and 800A illustrated in FIGS. 7A and 8A, respectively.

For example, means for transmitting may comprise a transmitter (e.g., the transmitter unit 222) and/or the antenna(s) 224 of the access point 110 illustrated in FIG. 2, a transmitter (e.g., the transmitter unit 254) and/or the antenna(s) 252 of the user terminal 120 portrayed in FIG. 2, or the transmitter 310 and/or antenna(s) 316 depicted in FIG. 3. Means for receiving may comprise a receiver (e.g., the receiver unit 222) and/or the antenna(s) 224 of the access point 110 illustrated in FIG. 2, a receiver (e.g., the receiver unit 254) and/or the antenna(s) 252 of the user terminal 120 shown in FIG. 2, or the receiver 312 and/or antenna(s) 316 depicted in FIG. 3. Means for processing, means for setting, means for selecting, means for interpreting, means for including, means for (separately) indicating, means for encoding, means for providing, means for generating, and/or means for (separately) determining may comprise a processing system, which may include one or more processors, such as the RX data processor 242, the TX data processor 210, and/or the controller 230 of the access point 110 illustrated in FIG. 2, the RX data processor 270, the TX data processor 288, and/or the controller 280 of the user terminal 120 illustrated in FIG. 2 or the processor 304 and/or the DSP 320 portrayed in FIG. 3.

According to certain aspects, such means may be implemented by processing systems configured to perform the corresponding functions by implementing various algorithms (e.g., in hardware or by executing software instructions). For example, an algorithm for setting bits to indicate a type of response expected for a transmission (e.g., an MPDU or PPDU) may receive, as input, a type of transmission to send and conditional inputs that might factor in to a decision on what type of response is expected for that transmission. Based on this input, the algorithm may set the appropriate bits to indicate the expected type of response. Similarly, an algorithm for determining what type of response is expected, based on bits in a received transmission may receive (as input) the bits and decide, based on a value of the bits, what type of response is expected.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover a, b, c, a-b, a-c, b-c, and a-b-c.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal, supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A first apparatus for wireless communications, comprising:
   a transmitter configured to transmit a packet to a second apparatus; and
   a processing system configured to:
      select a type of response expected from the second apparatus responsive to the transmitted packet from a group of types including at least one first type that indicates the response to be transmitted by the second apparatus is a null data packet (NDP) and at least one second type that indicates no response is expected; and
      set at least one bit in a header of the packet to indicate the type of response expected from the second apparatus responsive to the transmitted packet.

2. The first apparatus of claim 1, wherein the at least one bit comprises at least two bits set to a value that indicates no response is expected, that a null data packet (NDP) response is expected, that a normal response is expected, or that a long response is expected.

3. The first apparatus of claim 1, wherein the processing system is further configured to set a bit in the header of the packet to a value that indicates whether the packet comprises an aggregated media access control (MAC) protocol data unit (A-MPDU).

4. The first apparatus of claim 1, wherein the processing system is further configured to set an End of Frame (EOF) value to zero of a media access control (MAC) protocol data unit (MPDU) delimiter of the packet with a non-zero length field and wherein the EOF value further indicates the type of response expected.

5. The first apparatus of claim 1, wherein the packet comprises a physical layer convergence protocol (PLCP) protocol data unit (PPDU).

6. An apparatus for wireless communications, comprising:
   a receiver configured to receive a packet;
   a processing system configured to determine a type of response to transmit based on at least one bit in a header of the packet, wherein the type of response is selected from a group of types including at least one first type that indicates the response to be transmitted by the second apparatus is a null data packet (NDP) and at least one second type that indicates no response is expected; and
   a transmitter configured to transmit a response based on the determination.

7. The apparatus of claim 6, wherein the processing system is further configured to determine the type of response to transmit based on at least one of an aggregation bit in the packet header or an End of Frame (EOF) value.

8. The apparatus of claim 6, wherein:
   the processing system is further configured to determine that a bit in the header of the packet is set to a value that indicates the packet comprises an aggregated media access control (MAC) protocol data unit (A-MPDU); and
   the transmitter is configured to transmit a block acknowledgment (BA) in response to the packet based on the bit in the header.

9. The apparatus of claim 6, wherein:
   the processing system is further configured to determine that a first non-zero length media access control (MAC) protocol data unit (MPDU) delimiter has an End of Frame (EOF) value set to zero; and
   the transmitter is configured to transmit a block acknowledgment (BA) in response to the packet based on the EOF value.

10. The apparatus of claim 6, wherein the packet comprises a physical layer convergence protocol (PLCP) protocol data unit (PPDU).

11. A method for wireless communications by a first apparatus, comprising:
    transmitting a packet to a second apparatus;
    selecting a type of response expected from the second apparatus responsive to the transmitted packet from a group of types including at least one first type that indicates the response to be transmitted by the second apparatus is a null data packet (NDP) and at least one second type that indicates no response is expected; and
    setting at least one bit in a header of the packet to indicate the type of response expected from the second apparatus responsive to the transmitted packet.

12. The method of claim 11, wherein the at least one bit comprises at least two bits set to a value that indicates no response is expected, that a null data packet (NDP) response is expected, that a normal response is expected, or that a long response is expected.

13. The method of claim 11, further comprising setting a bit in the header of the packet to a value that indicates whether the packet comprises an aggregated media access control (MAC) protocol data unit (A-MPDU).

14. The method of claim 11, further comprising setting an End of Frame (EOF) value to zero of a media access control (MAC) protocol data unit (MPDU) delimiter of the packet with a non-zero length field and wherein the EOF value further indicates the type of response expected.

15. The method of claim 11, wherein the packet comprises a physical layer convergence protocol (PLCP) protocol data unit (PPDU).

16. A method for wireless communications by an apparatus, comprising:
    receiving a packet
    determining a type of response to send based on at least one bit in a header of the packet, wherein the type of response is selected from a group of types including at least one first type that indicates the response to be transmitted by the second apparatus is a null data packet (NDP) and at least one second type that indicates no response is expected; and
    transmitting a response based on the determination.

17. The method of claim 16, wherein the determining further comprises determining the type of response to send based on at least one of an aggregation bit in the header or an End of Frame (EOF) value.

18. The method of claim 16, further comprising:
determining that a bit in the header of the packet is set to a value that indicates the packet comprises an aggregated media access control (MAC) protocol data unit (A-MPDU); and
transmitting a block acknowledgment (BA) in response to the packet based on the bit in the header.

19. The method of claim 16, further comprising determining that a first non-zero length media access control (MAC) protocol data unit (MPDU) delimiter has an End of Frame (EOF) value set to zero; and
transmitting a block acknowledgment (BA) in response to the packet based on the EOF value.

20. The method of claim 16, wherein the packet comprises a physical layer convergence protocol (PLCP) protocol data unit (PPDU).

21. A first apparatus for wireless communications, comprising:
means for transmitting a packet to a second apparatus;
means for selecting a type of response expected from the second apparatus responsive to the transmitted packet from a group of types including at least one first type that indicates the response to be transmitted by the second apparatus is a null data packet (NDP) and at least one second type that indicates no response is expected; and
means for setting at least one bit in a header of the packet to indicate the type of response expected from the second apparatus responsive to the transmitted packet.

22. The first apparatus of claim 21, wherein the at least one bit comprises at least two bits set to a value that indicates no response is expected, that a null data packet (NDP) response is expected, that a normal response is expected, or that a long response is expected.

23. The first apparatus of claim 21, further comprising means for setting a bit in the header of the packet to a value that indicates whether the packet comprises an aggregated media access control (MAC) protocol data unit (A-MPDU).

24. The first apparatus of claim 21, further comprising means for setting an End of Frame (EOF) value to zero of a media access control (MAC) protocol data unit (MPDU) delimiter of the packet with a non-zero length field and wherein the EOF value further indicates the type of response expected.

25. The first apparatus of claim 21, wherein the packet comprises a physical layer convergence protocol (PLCP) protocol data unit (PPDU).

26. An apparatus for wireless communications, comprising:
means for receiving a packet means for determining a type of response to send based on at least one bit in a header of the packet, wherein the type of response is selected from a group of types including at least one first type that indicates the response to be transmitted by the second apparatus is a null data packet (NDP) and at least one second type that indicates no response is expected; and
means for transmitting a response based on the determination.

27. The apparatus of claim 26, wherein the means for determining is further configured to determine the type of response to send based on at least one of an aggregation bit in the header or an End of Frame (EOF) value.

28. The apparatus of claim 26, further comprising:
means for determining that a bit in the header of the packet is set to a value that indicates the packet comprises an aggregated media access control (MAC) protocol data unit (A-MPDU); and
means for transmitting a block acknowledgment (BA) in response to the packet based on the bit in the header.

29. The apparatus of claim 26, further comprising
means for determining that a first non-zero length media access control (MAC) protocol data unit (MPDU) delimiter has an End of Frame (EOF) value set to zero; and
means for transmitting a block acknowledgment (BA) in response to the packet based on the EOF value.

30. The apparatus of claim 26, wherein the packet comprises a physical layer convergence protocol (PLCP) protocol data unit (PPDU).

31. A computer program product for wireless communications, comprising a non-transitory computer-readable medium having instructions executable to:
transmit a packet to an apparatus;
select a type of response expected from the second apparatus responsive to the transmitted packet from a group of types including at least one first type that indicates the response to be transmitted by the second apparatus is a null data packet (NDP) and at least one second type that indicates no response is expected; and
set at least one bit in a header of the packet to indicate the type of response expected from the apparatus responsive to the transmitted packet.

32. A computer program product for wireless communications, comprising a non-transitory computer-readable medium having instructions executable to:
receive a packet at an apparatus;
determine a type of response to send for the packet based on at least one bit in a header of the packet, wherein the type of response is selected from a group of types including at least one first type that indicates the response to be transmitted by the second apparatus is a null data packet (NDP) and at least one second type that indicates no response is expected; and
transmit a response based on the determination.

33. A first wireless station, comprising:
at least one antenna;
a transmitter configured to transmit, via the at least one antenna, a packet a second wireless station; and
a processing system configured to
select a type of response expected from the second apparatus responsive to the transmitted packet from a group of types including at least one first type that indicates the response to be transmitted by the second apparatus is a null data packet (NDP) and at least one second type that indicates no response is expected; and
set at least one bit in a header of the packet to indicate the type of response expected from the second wireless station responsive to the transmitted packet.

34. A wireless station, comprising:
at least one antenna;
a receiver configured to receive a packet via the at least one antenna;
a processing system configured to determine a type of response to send for the packet based on at least one bit in a header of the packet, wherein the type of response is selected from a group of types including at least one first type that indicates the response to be transmitted by the second apparatus is a null data packet (NDP) and at least one second type that indicates no response is expected; and a transmitter configured to transmit a response based on the determination via the at least one antenna.

\* \* \* \* \*